(12) United States Patent
Barger

(10) Patent No.: US 10,184,545 B2
(45) Date of Patent: Jan. 22, 2019

(54) POWER DRIVE UNIT WITH DUAL GEAR RATIO MECHANISM

(71) Applicant: HAMILTON SUNDSTRAND CORPORATION, Windsor Locks, CT (US)

(72) Inventor: Victor Barger, Lake in the Hills, IL (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 211 days.

(21) Appl. No.: 15/227,351

(22) Filed: Aug. 3, 2016

(65) Prior Publication Data
US 2018/0038449 A1 Feb. 8, 2018

(51) Int. Cl.
*F16H 3/00* (2006.01)
*F16H 3/66* (2006.01)
*B64C 13/24* (2006.01)

(52) U.S. Cl.
CPC ............ *F16H 3/005* (2013.01); *B64C 13/24* (2013.01); *F16H 3/66* (2013.01); *F16H 2200/2007* (2013.01); *F16H 2200/2084* (2013.01)

(58) Field of Classification Search
None
See application file for complete search history.

(56) References Cited

U.S. PATENT DOCUMENTS

| | | | |
|---|---|---|---|
| 2,467,627 A | | 4/1949 | Olson |
| 3,452,621 A | * | 7/1969 | Golan ................ F16H 47/08 192/109 F |
| 3,927,579 A | * | 12/1975 | Golan ............... F16H 61/0274 475/119 |
| 4,420,992 A | * | 12/1983 | Windish ................. F16H 3/66 475/118 |
| 4,729,408 A | * | 3/1988 | Coutant ................ F16H 61/12 137/596.14 |
| 5,531,651 A | * | 7/1996 | Yang ..................... F16H 3/005 254/352 |
| 5,967,934 A | * | 10/1999 | Ishida .................... F16H 3/66 475/269 |
| 7,044,877 B2 | | 5/2006 | Ai |
| 7,815,542 B2 | * | 10/2010 | Dec ....................... F16H 3/60 192/69.91 |

(Continued)

FOREIGN PATENT DOCUMENTS

| | | | | |
|---|---|---|---|---|
| DE | 102007033417 A1 | * | 1/2009 | ............ F16H 3/005 |
| DE | 10 2014 109167 A1 | | 1/2016 | |

(Continued)

OTHER PUBLICATIONS

Extended European Search Report for Application No. 17184221.4, dated Dec. 22, 2017 (9 pp).

*Primary Examiner* — Dirk Wright
(74) *Attorney, Agent, or Firm* — Cantor Colburn LLP

(57) ABSTRACT

A gear ratio mechanism includes an input shaft, a first planetary gear set, a second planetary gear set, and a carrier link associated with an output shaft. The carrier link is configured to couple the first planetary gear set and the second planetary gear set. The carrier link is selectively driven by the first planetary gear set and the second planetary gear set in response to rotation of the input shaft.

18 Claims, 5 Drawing Sheets

(56) References Cited

U.S. PATENT DOCUMENTS

| | | | |
|---|---|---|---|
| 8,413,547 B2* | 4/2013 | Yang | F16H 3/003 475/12 |
| 8,418,585 B2* | 4/2013 | Yang | F16H 3/003 74/319 |
| 8,439,783 B2* | 5/2013 | Yang | F16H 37/06 475/207 |
| 8,668,613 B1 | 3/2014 | Stevens et al. | |
| 9,243,699 B2* | 1/2016 | Yang | F16H 3/003 |
| 2016/0016653 A1 | 1/2016 | Barger | |

FOREIGN PATENT DOCUMENTS

| | | |
|---|---|---|
| EP | 2 851 284 A1 | 3/2015 |
| GB | 741641 A | 12/1955 |
| JP | 2000-193049 A | 7/2000 |
| WO | 2015/106737 A1 | 7/2015 |

* cited by examiner

POWER DRIVE UNIT WITH DUAL GEAR RATIO MECHANISM

BACKGROUND

The subject matter disclosed herein generally relates to a power drive unit and, more specifically, to a power drive unit having multiple torque and speed outputs.

An aircraft utilizes a flight control high lift system having one or more movable control surfaces. For example, an aircraft wing may include a plurality of flaps located along a trailing edge of the wing and/or a plurality of slats located along a leading edge of the wing. Movement of such movable control surfaces may result in a directional flow of fluid over a portion of the aircraft. For example, movement of the flaps results in a change in the amount of lift provided by a wing of the aircraft.

A typical flight control high lift system requires a power drive unit for both the slats and the flaps. The flight control high lift system has several different performance points for torque and speed; however, a conventional power drive unit includes only a single gear ratio reduction between its input and output. As a result, the single gear ratio limits the power drive unit from meeting the significant variation of torque and speed required for association with both the slats and the flaps.

BRIEF SUMMARY

In one embodiment, a gear ratio mechanism includes an input shaft, a first planetary gear set, a second planetary gear set, and a carrier link associated with an output shaft. The carrier link is configured to couple the first planetary gear set and the second planetary gear set. The carrier link is selectively driven by the first planetary gear set and the second planetary gear set in response to rotation of the input shaft.

According to another embodiment, a power drive unit associated with a plurality of components includes at least one motor, and a gear ratio mechanism having an input shaft and an output shaft. The at least one motor is operably coupled to the input shaft. The output shaft is operably coupled to the plurality of components. The gear ratio mechanism is capable of driving the output shaft using a plurality of gear ratios, and one of the plurality of gear ratios is selected based on a corresponding component of the plurality of components.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
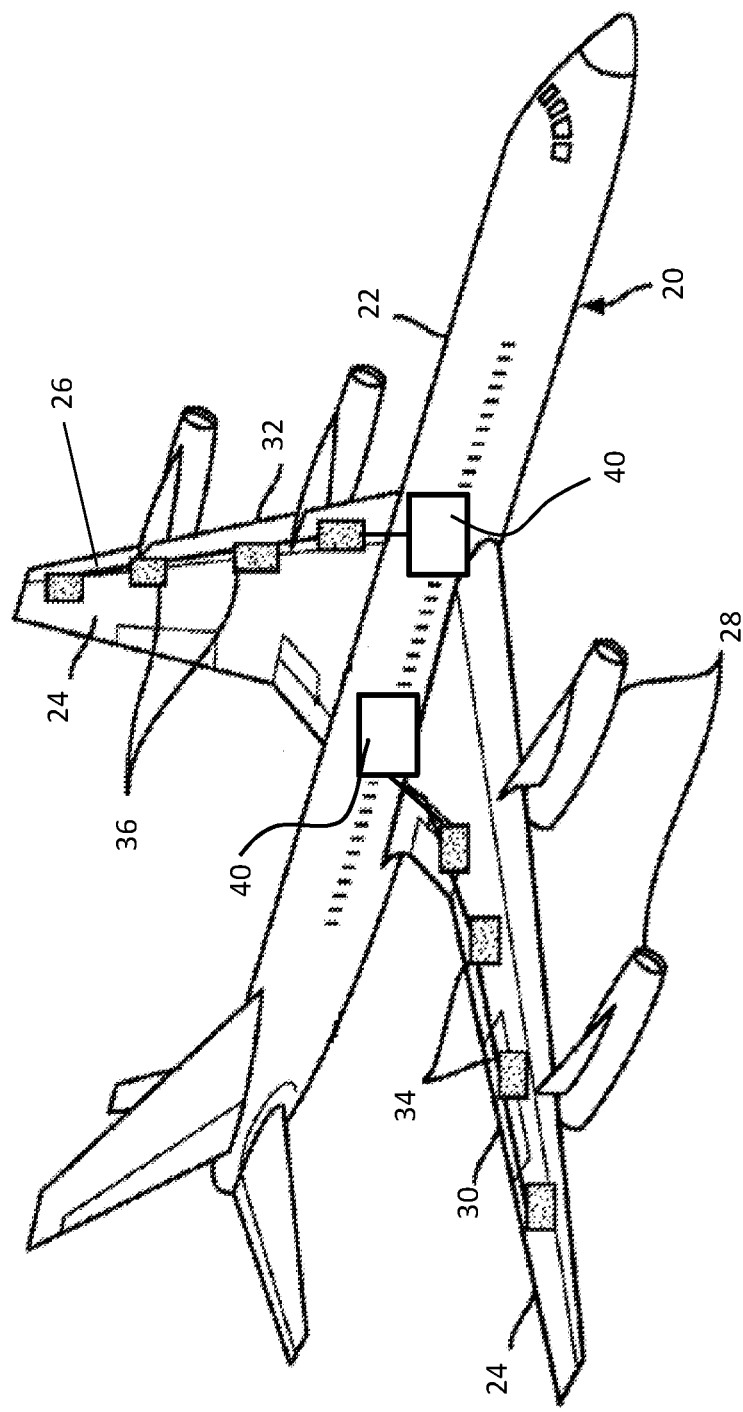
FIG. 1 is a perspective view of an example of an aircraft.

Referring to FIG. 1, an aircraft 20 includes a fuselage 22, static aerodynamic surfaces (i.e. wings) 24 extending outwardly from the fuselage 22, dynamic aerodynamic surfaces 26, and one or more engines 28. The one or more engines 28 may be attached to a static aerodynamic surface 24 or to the fuselage 22, and are configured to generate thrust to move the aircraft 20. Examples of the dynamic aerodynamic surfaces 26 includes flap control surfaces 30 (also referred to herein as "flaps") disposed at a trailing edge of the static aerodynamic surfaces 24 and slat control surfaces 32 (also referred to herein as "slats") located at the leading edge of the static aerodynamic surfaces 24. The flaps 30 are pivotable relative to the static aerodynamic surfaces 24 via one or more flap actuators 34, which may be controlled and driven by a power drive unit 40. Similarly, one or more slat actuators 36 are configured to move the slats 32 relative to the static aerodynamic surfaces 24. The slat actuators 36 are also driven by a power drive unit 40.

Figure 2:
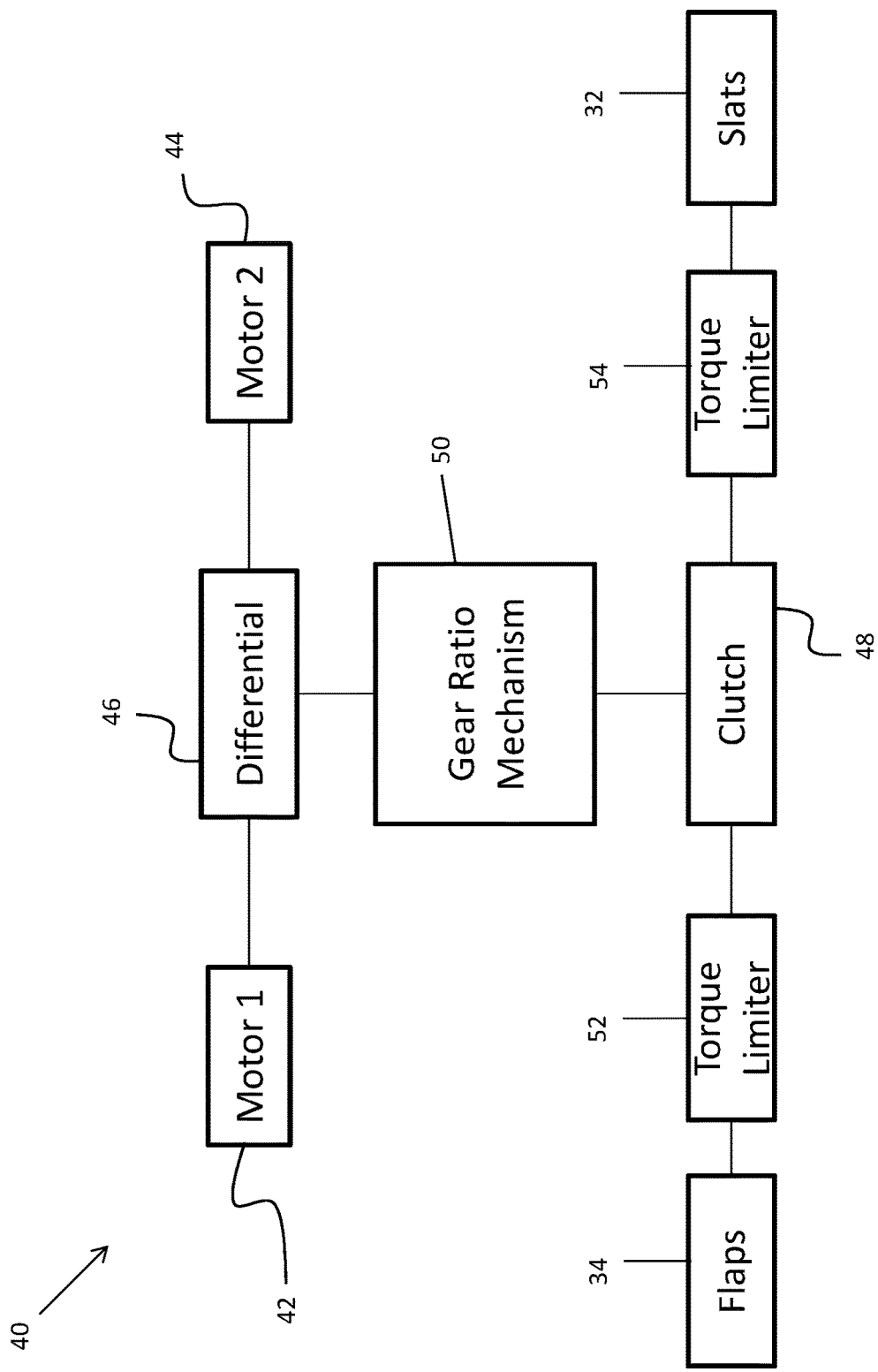
FIG. 2 is a schematic diagram of a power drive unit associated with an aircraft.

A schematic diagram of a power drive unit 40 configured to control and drive both the slat actuators 36 and the flap actuators 34 is shown in FIG. 2. The power drive unit 40 includes a plurality of motors 42, 44 associated with a differential 46. An upstream end of the gear ratio mechanism 50 is connected to the differential 46 and a downstream end of the gear ration mechanism 50 is connected to a clutch 48. The clutch 48 is operably coupled to one of a first torque limiter 52 associated with movement of a first component, such as the flaps 30 for example, and a second torque limiter 54 associated with movement of a second component, such as the slats 32 for example. To accommodate the different output requirements associated with the different components, such as the different torque and speeds associated with the slats 32 and flaps 30, the gear ratio mechanism 50 is configured to provide a plurality of gear ratios.

It should be understood that the configuration of the power drive unit 40 is intended as an example only, and that other configurations are also contemplated herein. For example, the gear ratio mechanism 50 can be utilized with two motors, one motor or no motors. Alternatively, or in addition, the gear ratio mechanism 50 may be utilized without a differential 46, without a clutch 48, and/or without a torque limiter 52, 54. As such, the gear ratio mechanism 50 can be a standalone component.

Figure 3:
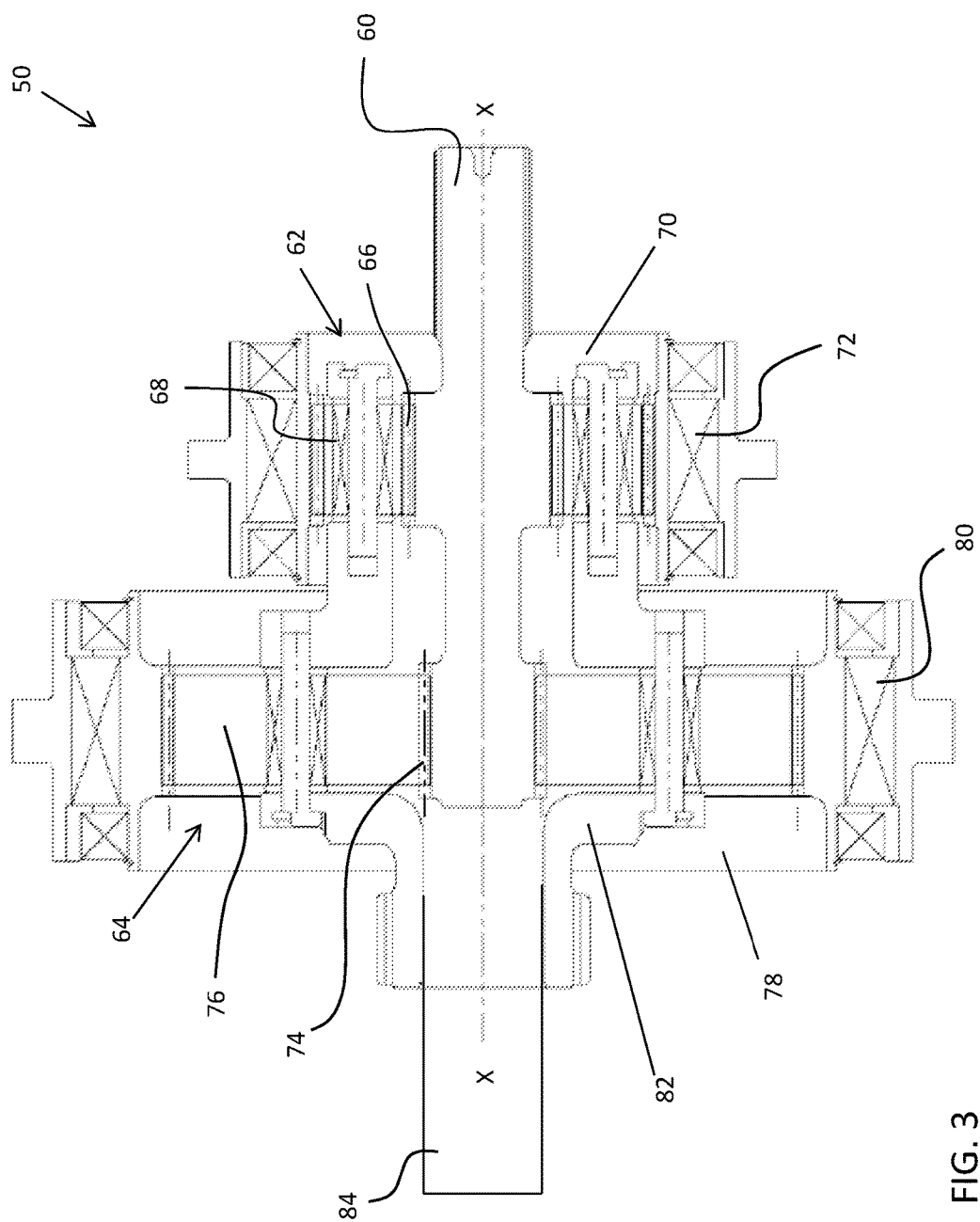
FIG. 3 is a cross-sectional view of a gear ratio mechanism of a power drive unit according to an embodiment.
Figure 4:
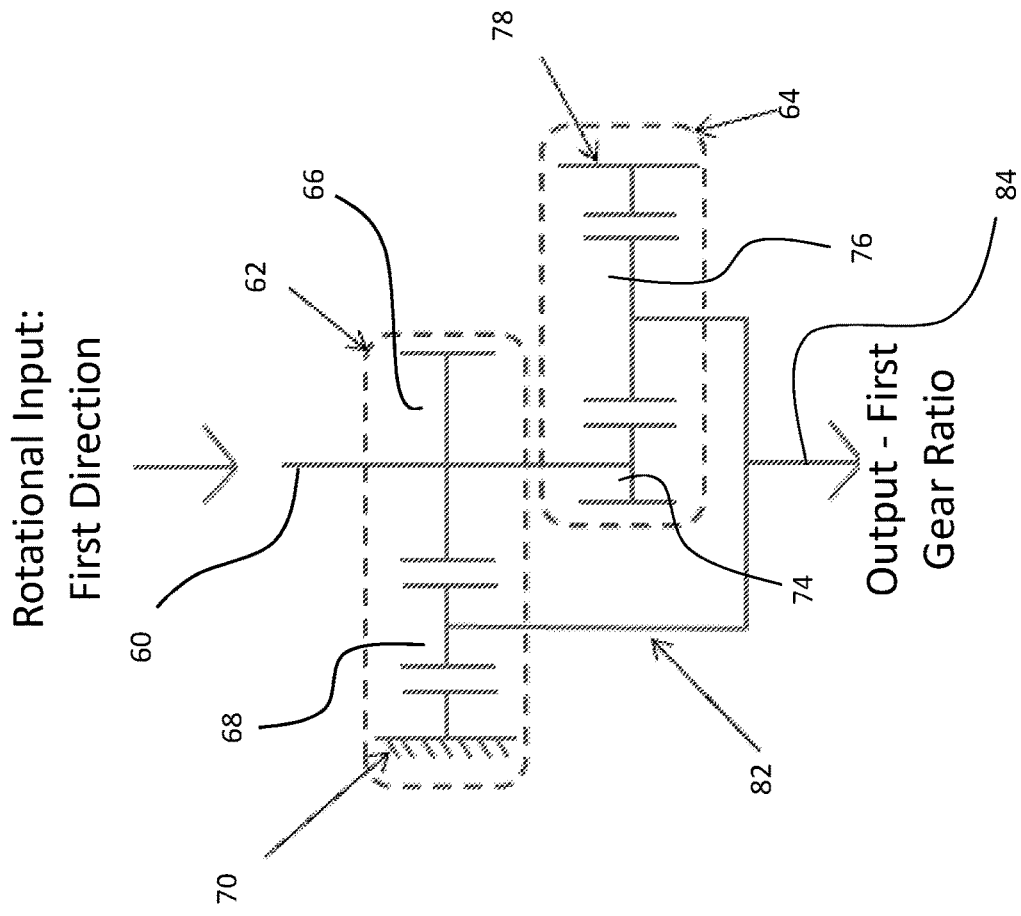
FIG. 4 is a schematic diagram of a gear ratio mechanism of a power drive unit when an input shaft is operated in a first direction according to an embodiment.
Figure 5:
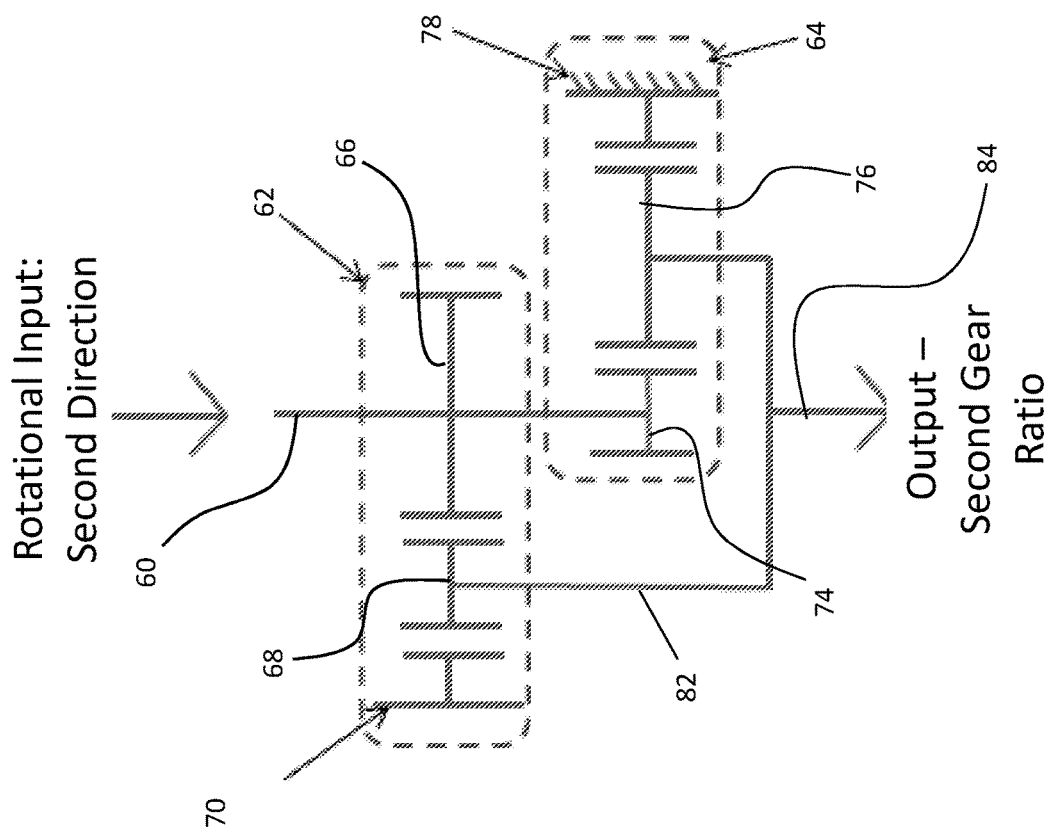
FIG. 5 is a schematic diagram of a gear ratio mechanism of a power drive unit when an input shaft is operated in a second direction according to an embodiment.

With reference now to FIGS. 3-5, various views of a gear ratio mechanism 50 configured to provide an output associated with a plurality of gear ratios are illustrated. The gear ratio mechanism 50 includes a central input shaft 60 rotatable about an axis X. Mounted to the input shaft 60 are a first planetary gear set 62 and a second planetary gear set 64. The first planetary gear set 62 includes a first sun gear 66 arranged concentrically with and fixedly mounted to the input shaft 60. The first planetary gear set 62 additionally includes one or more first planet gears 68 mounted adjacent to and interposed with the first sun gear 66. Arranged concentrically with the first sun gear 66 and the at least one first planet gear 68 is a first ring gear 70. The first ring gear 70 is arranged in a meshing relationship with the at least one first planet gear 68. The first ring gear 70 is operably coupled to a one-way clutch mechanism 72, such as a sprag or over running clutch or a ratchet and pawl mechanism for example. Accordingly, the one way mechanism 72 is configured to allow rotation of the first ring gear 70 in only a single direction.

The second planetary gear set 64 includes a second sun gear 74 arranged concentrically with and fixedly mounted to the input shaft 60. In the illustrated, non-limiting embodiment, the second sun gear 74 is mounted to the input shaft 60 downstream from the first sun gear 66. One or more second planet gears 76 are mounted adjacent to and interposed with the second sun gear 74. A second ring gear 78 is arranged in meshing engagement with the one or more second planet gears 78. The second ring gear 78 is operably coupled to another one way clutch mechanism 80, such that rotation of the second ring gear 78 is allowed in only a single direction.

In an embodiment, the one way mechanism 72 associated with the first ring gear 70 is configured to allow rotation of the first ring gear 70 in a first direction, and the one way mechanism 80 associated with the second ring gear 78 is configured to allow rotation of the second ring gear 78 in a second direction, opposite the first direction. As a result, depending on the direction of rotation of the input shaft 60 about axis X, one of the first and second planetary sets 62, 64 is active and the other of the first and second planetary sets 62, 64 is inactive.

The one or more first planet gears 68 and the at least one second planet gear 76 are operably coupled via a carrier link 82. The carrier link 82 may be coupled to an output shaft 84 such that rotation of one of the first planet gears 68 and the second planet gears 76 is configured to drive the carrier link 82, and therefore the output shaft 84, of the gear ratio mechanism 50. The first planetary gear set 62 has a first gear ratio and the second planetary gear set 64 has a second gear ratio, different from the first gear ratio. Accordingly, the rotational speed of the output shaft 84 is dependent on whether the output shaft 84 is being driven by the first planetary gear set 62 or the second planetary gear set 64. In an embodiment, the output shaft 84 is arranged coaxially with the input shaft 60 for rotation about axis X.

To operate the gear ratio mechanism 50 such that the output shaft 84 is driven by the first planetary set 62, the input shaft 60 of the gear ratio mechanism 50 is rotated in a first direction, as shown in FIG. 4. Rotation of the input shaft 60 about the axis X, causes the first sun gear 66 and the second sun gear 74 to rotate in the same first direction. Each of the first and second planet gears 68, 76 engaged with the sun gears 66, 74 will rotate about a respective axis in the same second direction, opposite the first direction. The movement of the first and second planet gears 68, 76 in turn drives rotation of the first ring gear 70 and the second ring gear 78 in the same second direction. However, only the one-way mechanism 80 associated with the second ring gear 78 allows rotation in the second direction. Accordingly, the one-way mechanism 72 coupled to the first ring gear 70 holds the first ring gear 70 in a fixed position. Because the first ring gear 70 is fixed, the one or more first planets 68 will move relative to the sun gear 66 and the ring gear 70, thereby generating a torque which drives rotation of the carrier link 82 and the output shaft 84. The output shaft 84 may be driven in either the same direction of the opposite direction as the input shaft 60, depending on the configuration of the planetary gear sets 62, 64.

When the input shaft 60 of the gear ratio mechanism 50 is rotated in the second, opposite direction, as shown in FIG. 5, both the first sun gear 66 and the second sun gear 74 rotate in the second direction. Each of the first and second planet gears 68, 76 engaged with the corresponding sun gears 66, 74 will rotate about a respective axis in the same first direction, thereby driving rotation of the first ring gear 70 and the second ring gear 78 in the same first direction. Because the one-way mechanism 72 associated with the first ring gear 70 allows rotation in the second direction, the first ring gear 70 is free to rotate. The second ring gear 78, however, is held in a fixed position because the one-way mechanism 80 coupled thereto only allows rotation of the second ring gear 78 in the second direction. As a result, when the input shaft 60 is driven in the second direction, the one or more second planets 76 will move relative to the sun gear 74 and the ring gear 78. This movement of the second planets 76 generates a torque configured to drive the carrier link 82 and the output shaft 84 of the gear ratio mechanism. Accordingly, each direction of rotation of the input shaft 60 of the gear ratio mechanism 50 is associated with a corresponding gear ratio, and a direction of rotation of the input shaft 60 may be selected based on whether to supply power to the flap actuators 34 or the slat actuators 36.

Because two performance points can be achieved via the first and second gear ratios of a power drive unit 40 having a gear ratio mechanism 50 as described herein, a motor power and sizing benefit can be realized. These power and size benefits may result in further weight, cost, and power reductions.

While the present disclosure has been described in detail in connection with only a limited number of embodiments, it should be readily understood that the present disclosure is not limited to such disclosed embodiments. For instance, the core panel and composite sandwich panel described herein may be utilized in a variety of applications, such as aircraft, wind turbines, maritime propulsion, ground transportation (bus, rail, truck, etc.) Further, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A gear ratio mechanism comprising:
    an input shaft;
    a first planetary gear set;
    a second planetary gear set;
    a carrier link associated with an output shaft, the carrier link being configured to couple the first planetary gear set and the second planetary gear set, wherein the carrier link is selectively driven by the first planetary gear set and the second planetary gear set in response to rotation of the input shaft.

2. The gear ratio mechanism according to claim 1, wherein the first planetary gear set has a first gear ratio and the second planetary gear set has a second gear ratio, the first gear ratio and the second gear ratio being different.

3. The gear ratio mechanism according to claim 1, wherein the carrier link is driven by the first planetary gear set when the input shaft is rotated in a first direction.

4. The gear ratio mechanism according to claim 3, wherein the carrier link is driven by the second planetary gear set when the input shaft is rotated in a second direction.

5. The gear ratio mechanism according to claim 1, wherein the first planetary gear set includes a first sun gear coupled to the input shaft, at least one first planet gear, and a first ring gear and the second planetary gear set includes a second sun gear coupled to the input shaft, at least one second planet gear, and a second ring gear.

6. The gear ratio mechanism according to claim 5, further comprising a first one way mechanism associated with the first ring gear and a second one way mechanism associated with the second ring gear.

7. The gear ratio mechanism according to claim 6, wherein the first one way mechanism is configured to restrict rotation of the first ring gear in a first direction and the second one way mechanism is configured to restrict rotation of the second ring gear in a second direction.

8. A method of providing power to a plurality of components comprising:
   rotating an input shaft of a gear ratio mechanism in a first direction to drive an output shaft of the gear ratio mechanism associated with the plurality of components using a first gear ratio, the gear ratio mechanism including a first planetary gear set, a second planetary gear set, and a carrier link associated with the output shaft and coupling the first planetary gear set and the second planetary gear set; and
   rotating the input shaft of the gear ratio mechanism in a second direction to drive the output shaft using a second gear ratio.

9. The method according to claim 8, wherein the first gear ratio is associated with a first component of the plurality of components and the second gear ratio is associated with a second component of the plurality of components.

10. The method according to claim 8, wherein rotating the input shaft in the first direction causes the first planetary gear set to drive rotation of the carrier link and the output shaft using the first gear ratio.

11. The method according to claim 10, wherein rotating the input shaft in the second direction causes the second planetary gear set to drive rotation of the carrier link and the output shaft using the second gear ratio.

12. A power drive unit associated with a plurality of components comprising:
   at least one motor;
   a gear ratio mechanism including:
      a first planetary gear set;
      a second planetary gear set;
      a carrier link associated with an output shaft, the carrier link connecting the first planetary gear set and the second planetary gear set; and
      an input shaft and an output shaft, the at least one motor being operably coupled to the input shaft, the output shaft being operably coupled to the plurality of components, wherein the gear ratio mechanism is capable of driving the output shaft using a plurality of gear ratios, and one of the plurality of gear ratios is selected based on a corresponding component of the plurality of components.

13. The power drive unit according to claim 12, wherein the output shaft is driven using a first gear ratio when the output shaft is coupled to a first component of the plurality of components and the output shaft is driven using a second gear ratio when the output shaft is coupled to a second component of the plurality of components.

14. The power drive unit according to claim 12, wherein when the first planetary gear set has a first gear ratio and the second planetary gear set has a second gear ratio, the first gear ratio and the second gear ratio being different.

15. The power drive unit according to claim 12, wherein the carrier link is driven by the first planetary gear set when the input shaft is rotated in a first direction.

16. The power drive unit according to claim 12, wherein the carrier link is driven by the second planetary gear set when the input shaft is rotated in a second direction.

17. The power drive unit according to claim 12, further comprising a first one way mechanism associated with the first planetary gear set and a second one way mechanism associated with the second planetary gear set.

18. The power drive unit according to claim 17, wherein the first one way mechanism and the second one way mechanism are operable to control whether the carrier link is driven by the first planetary gear set and the second planetary gear set.

* * * * *